(12) United States Patent
Carlson et al.

(10) Patent No.: US 7,284,198 B2
(45) Date of Patent: Oct. 16, 2007

(54) METHOD AND SYSTEM FOR DOCUMENT DRAFT REMINDER BASED ON INACTIVITY

(75) Inventors: Michael P. Carlson, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 10/960,587

(22) Filed: Oct. 7, 2004

(65) Prior Publication Data

US 2006/0080619 A1    Apr. 13, 2006

(51) Int. Cl.
*G06F 17/00* (2006.01)

(52) U.S. Cl. ..................... 715/530; 715/511
(58) Field of Classification Search ............... 715/500, 715/511, 524, 526, 530
See application file for complete search history.

(56) References Cited

U.S. PATENT DOCUMENTS

| | | | |
|---|---|---|---|
| 5,680,636 A | 10/1997 | Levine et al. ............. 395/800 |
| 5,958,005 A | 9/1999 | Thorne et al. ............. 709/202 |
| 6,330,444 B1 * | 12/2001 | Rune et al. ................ 455/433 |
| 6,785,681 B2 * | 8/2004 | Keskar et al. ............... 707/10 |
| 6,961,896 B1 * | 11/2005 | Rousselle et al. ......... 715/500.1 |
| 6,980,993 B2 * | 12/2005 | Horvitz et al. ............. 707/102 |
| 2003/0028524 A1 * | 2/2003 | Keskar et al. ................ 707/3 |
| 2003/0131142 A1 * | 7/2003 | Horvitz et al. ............. 709/313 |
| 2004/0001101 A1 | 1/2004 | Trajkovic et al. .......... 345/781 |
| 2004/0003352 A1 * | 1/2004 | Bargeron et al. .......... 715/530 |
| 2004/0078797 A1 * | 4/2004 | Liao ......................... 719/310 |
| 2004/0122947 A1 * | 6/2004 | Banerjee et al. ........... 709/225 |
| 2004/0237026 A1 * | 11/2004 | Aust ......................... 715/500 |
| 2005/0148890 A1 * | 7/2005 | Hastings ................... 600/509 |
| 2005/0151640 A1 * | 7/2005 | Hastings ............... 340/539.11 |
| 2005/0222870 A1 * | 10/2005 | Schumann et al. ........... 705/2 |

* cited by examiner

*Primary Examiner*—Stephen Hong
*Assistant Examiner*—Gregory J. Vaughn
(74) *Attorney, Agent, or Firm*—Mark S. Walker; Suiter Swantz pc llc (57) ABSTRACT

The present invention provides a flexible system and method for notifying a user when the user has an open document which is inactive over a predetermined period of inactivity defined by the user. The user may be able to set a desirable period of inactivity for each application at the time of the system initialization and change the desirable period of inactivity for an inactive document after the user receives notification.

33 Claims, 5 Drawing Sheets

FIG. 1

|  | 201 | 202 | 203 |
|---|---|---|---|
|  | Application | TimeOut | Notification flag |
| 205 — | Application1 | 15 min | On |
|  | Application2 | 30 min | On |
|  | Application3 | 30 min | On |
| 210 — | Application4 | Default | Off |
|  | Application5 | 30 min | On |

| | 402 | 404 | 406 | 408 | 410 |
|---|---|---|---|---|---|
|  | Document Name | Application | Time Out | Alarm Flag | Smart Time (inactive) |
| 415 | "Hi" | Application1 | 15 min | off | 7:15 |
| 420 | "Learning Eclipse" | Application2 | 30 min | on | 7:20 |
| 425 | "Presentation" | Application3 | 10 min | on | 7:25 |

METHOD AND SYSTEM FOR DOCUMENT DRAFT REMINDER BASED ON INACTIVITY

FIELD OF THE INVENTION

The present invention generally relates to the field of computer application, and particularly to a method and system for reminding a user of inactive documents.

BACKGROUND OF THE INVENTION

More and more computer users are interrupted by external communications such as phone calls, instant messaging, pages, alerts, emails and the like. With all of these distractions and interruptions, some users may forget about a document in which the user is editing. For example, a user begins to write a response to an email but he/she gets an important phone call or an instant message that requires an immediate attention. Some time after, the user is busy with other tasks without realizing that there is an unfinished response to the email. When the user returns to write the response again, the user may have forgotten the reason for responding to the email. In such a case, the user may have to read the email again. Similar incidents may happen everyday while a user is drafting documents. The user may waste his/her time and efforts to restart the incomplete document. However, there is no method to remind the user of the incomplete document after some predetermined time.

Therefore, it would be desirable to provide a system and method for document draft reminder of incomplete documents after some predetermined time defined by a user.

SUMMARY OF THE INVENTION

Accordingly, the present invention provides a system and method for notifying a user of numerous incomplete tasks based on a predetermined time threshold set by the user. The system and method may provide a flexible notification scheme for an individual user. The user may select monitored applications which the system may monitor for an inactive document at the system initialization phase. The user may be able to set various time thresholds for different applications and documents. The system may record information provided by the user to a reference table. As a result, the reference table may contain a period of inactivity value for each monitored application. The system may also maintain a list of open documents. Thus, whenever the user opens a new document, information of the new document will be added to the list of open documents. Each of the documents in the list of open documents is subject to be monitored by the system. If the user is away from one of the documents monitored by the system, the system may detect inactivity of the document. Then, the system may set a timer for the inactive document based on the time threshold. When the timer expires, the system may notify the user of the inactive document. In an advantageous aspect of the present invention, the user may enjoy great freedom to have a flexible notification for each individual document. After receiving notification, the user may resume drafting the inactive document, request the system to notify the user of the inactive document with a different time threshold value, or disable the notification feature. An inactivity timer may be statically set per application environment, or it may be dynamically adjusted such that the inactivity value is generated based on the amount of input entered into a document.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 6, exemplary embodiments of the present invention are shown.

The present invention provides a system and method for notifying a user when the user has an open document which is inactive for a predetermined period of inactivity set by the user. Preferably, the documents which the notification system monitors may be produced by applications capable to support document drafting. Examples of such applications may include MICROSOFT WORD®, OUTLOOK®, POWERPOINT®, IBM LOTUS® email editor or the like. In an advantageous aspect of the present invention, the user may be able to set a desirable period of inactivity for each application at the time of the system initialization. In an embodiment of the present invention, the period of inactivity for each application may be further adjusted dynamically and proportionally based on the amount of user input entered by the user during the instant application session. For example, if the user has entered only a few characters or made very small modifications to a document, the period of inactivity may default to the predetermined value. However, if the user has made a large number of substantive changes, the period of inactivity may be increased to denote a lesser degree of urgency in processing the document or it may be decreased to denote a greater degree of urgency in processing the document.

Figure 1:
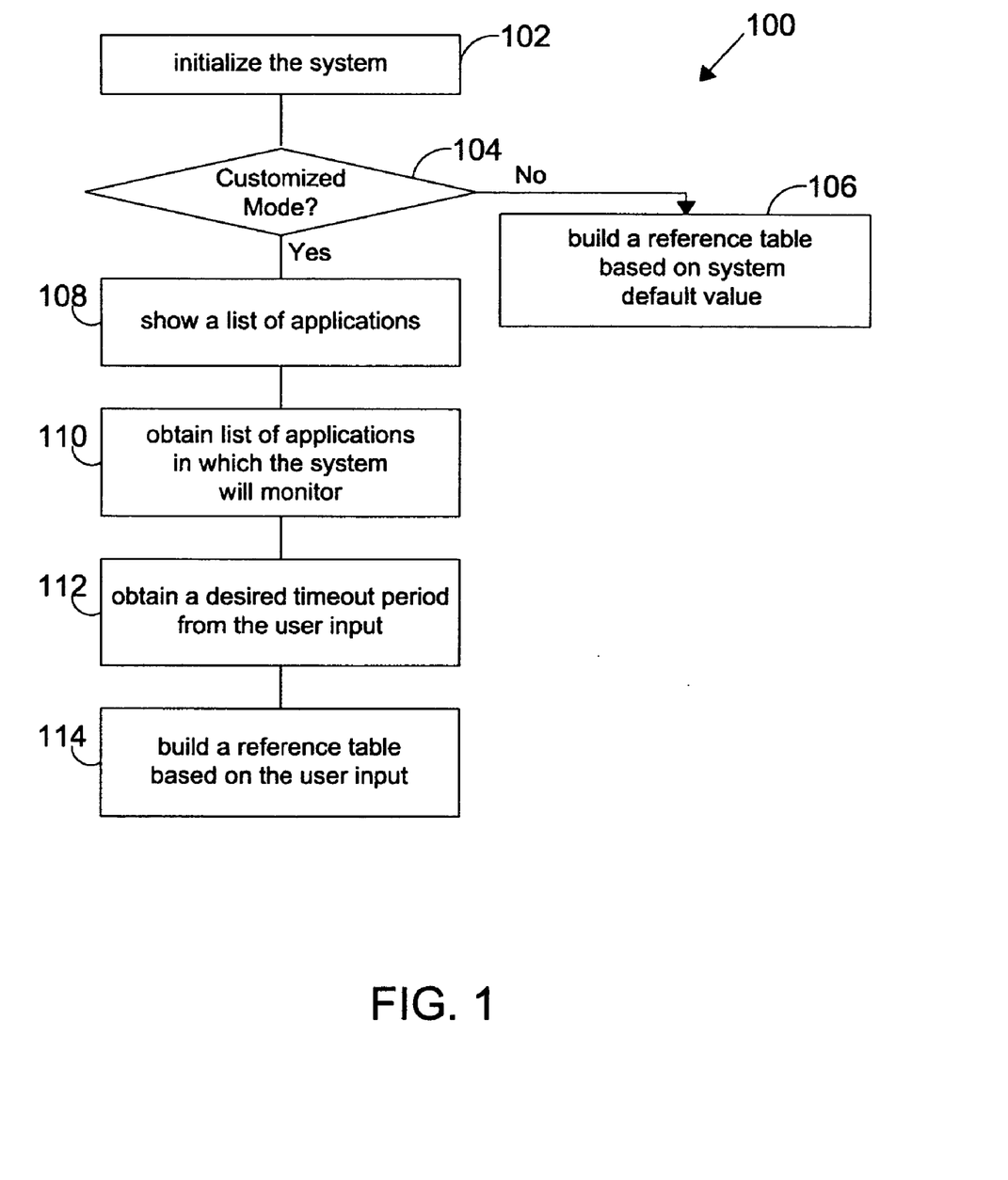
FIG. 1 is a flow diagram describing the steps necessary to initialize an exemplary system of the present invention.

Referring to FIG. 1, a flow diagram describing the steps necessary to initialize an exemplary notification system of the present invention is shown. The process 100 may begin with the step in which the notification system is initialized. The user may have a choice to have a customized mode or a default mode. Initially, the notification system may have a default period of inactivity value and a default list of applications. It is well known in the art that the computer operating system may have information of applications installed in the given computer system. The notification system may ask the user whether the user wants to have a customized period of inactivity for each application capable of supporting document drafting 104. If the user does not want to have a customized period of inactivity, the notification system may build a references table using a default period of inactivity (time threshold) and a default application list 106. Alternatively, the notification system may have a default reference table as a part of the notification system. If the user wants to have a customized period of inactivity, the notification system may show a list of applications currently operable in the given computer system 108. For example, the notification system may show a list including IBM LOTUS® email editor, MICROSOFT WORD®, MICROSOFT OUTLOOK®, MICROSOFT POWER-POINT®, ADOBE PHOTOSHOP®, or the like. The user will select a plurality of applications the user wants to have notification of inactive documents implemented 110. For each selected application, the user may input a desired period of inactivity 112. The notification system may build a reference table based on the desired period of inactivity and the monitored application list 114.

Figure 2:
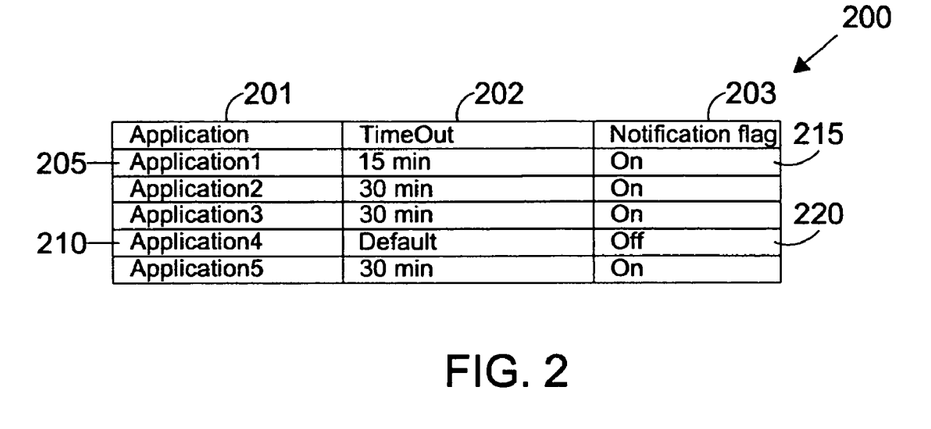
FIG. 2 is an illustration of an exemplary reference table in accordance with the present invention.

An exemplary reference table 200 is shown in FIG. 2. The reference table 200 may contain information of an application 201, a desired period of inactivity 202, and a notification flag 203. The notification flag 203 may have "ON" value if the user wants a reminder for a certain application document. For example, the user wants to have notification for application1 document for a 15 minute period of inactivity but does not want any notification for application4 documents. Notification flag 215 will be set to "ON" for application1 and Notification Flag 220 will be set to "OFF" for application4. Based on the reference table 200, the notification system will monitor application1 documents for its inactivity but won't monitor application4 documents for its inactivity. In an embodiment of the present invention, the period of inactivity value of the application will have a system default value unless the user provides a different period of inactivity value.

After the notification system builds the reference table, the notification system may be able to monitor open documents for their inactivity. Generally, a document is a file created by an application which allows a user to read or write. A document may be stored on a recording medium such as a hard disk, a floppy disk or the like. When the user opens a document, a computer operating system initiates the application which may produce a new document. A saved document may be opened by retrieving the document from a recording medium storing the document file. In an embodiment of the present invention, the notification system may assume that the document is opened unless the user closes the document file. The computer operating system disengages the recording medium with respect to the document file when the user closes the documents. In an embodiment of the present invention, the notification system may be a part of a computer operating system and detect inactivity of the open document based on the user's input. For instance, the notification system may recognize inactivity when there is no user input on any open document over an inactivity threshold time such as thirty seconds, one minute or the like while the operating system is running. The user input may be detected by movement of a mouse, key input via keyboard, or the like. The inactivity threshold time may be used to determine whether the inactivity of the document begins.

Figure 3:
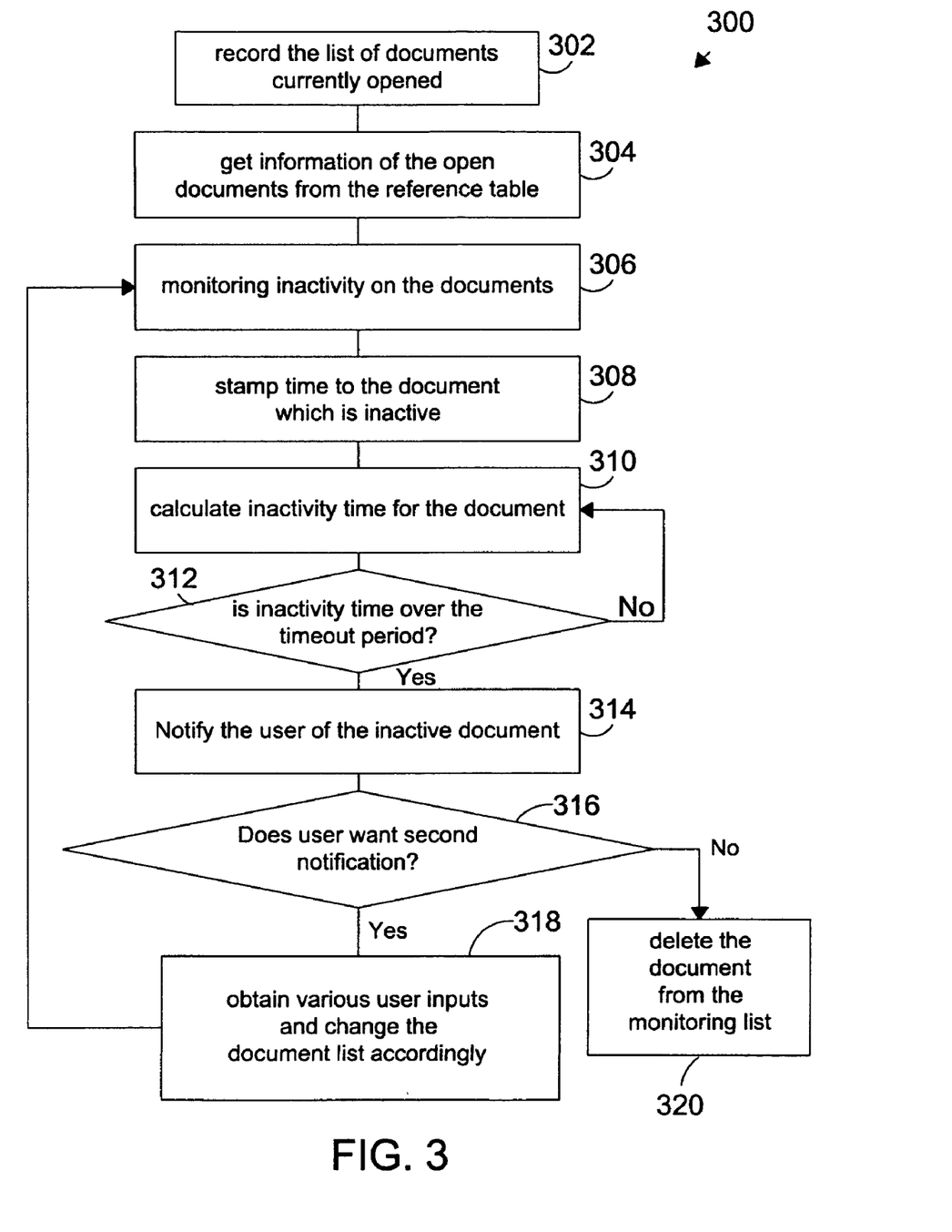
FIG. 3 is a flow diagram describing the steps to perform a notification process in the exemplary system of the present invention.
Figure 4:
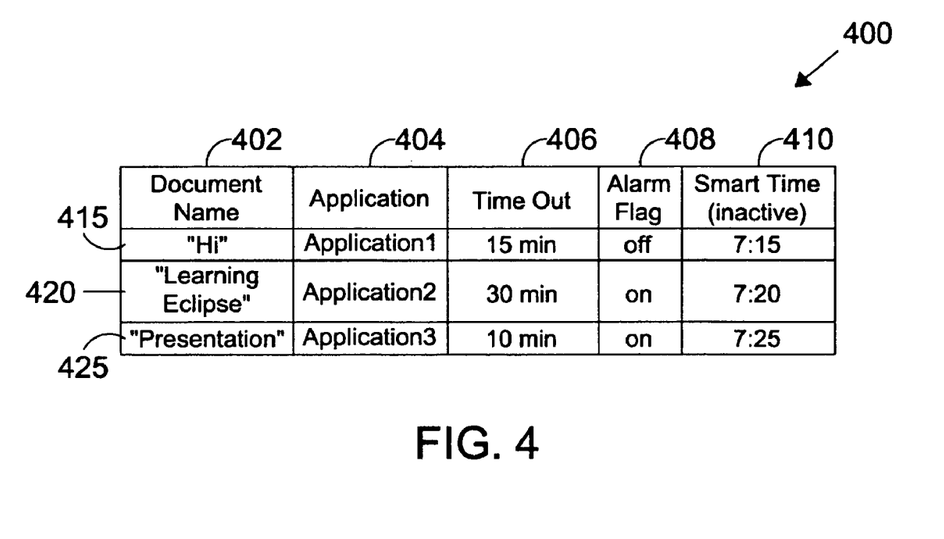
FIG. 4 is an illustration of an exemplary document list in accordance with the present invention.

FIG. 3 is a flow diagram describing the steps to perform a notification process in the exemplary notification system of the present invention. The process 300 may begin with the step in which the notification system may generate a list of documents currently opened by the user 302. Referring now to FIG. 4, an exemplary document list 400 is shown. The document list may include information of open documents such as a document name 402, an application 404 supporting the document, a desired or calculated period of inactivity 406 and the like. If the open document is supported by an application which has "OFF" for its notification flag in the reference table, the notification system will not add the open document into the document list 400. Based on the reference table, a period of inactivity value for each document may be stored in the document list 404. For example, when the user opens an application1 document titled "HI," the notification system may record "HI" document 415 to the document list 400. The Alarm_flag 405 for "HI" document is set to "ON" indicating that the notification system will monitor "HI" document. The notification system may consult with the reference table to obtain the period of inactivity of application1. As a result, a 15 minute period of inactivity for "HI" document will be stored in the document list. Alternatively, if the document has been edited substantially, for example, one half percent of the document has been modified, then the 15 minute period of inactivity may be decreased by one half to 7.5 minutes. If the document has been edited with minor changes, for example, $1/10$ of the document has been modified, then the 15 minute period of inactivity may be decreased by $1/10$ to 13.5 minutes. A minimum threshold value may be set when the document has been completed modified, as is the case when working with a new document. In such a case, the default inactivity value may take effect.

Referring again to FIG. 3, the notification system may monitor the documents in the document list for their inactivity 306. Initially, the documents in the document list may be marked to be monitored (notified) having their Alarm_flags set to "ON". Upon a detection of inactivity of a document, the notification system records the starting time of inactivity of the document to the document list 308. The notification system will calculate a period of inactivity of the document 310. The notification system may compare the period of inactivity provided by the document list and the inactivity time (the time period while the document has been inactive). If the inactivity time is over the period of inactivity, the notification system notifies the user of the inactive document 314. If the user wants to have a second notification for the inactive document 316, the notification system may set a desired period of inactivity value for the document based on the user input or the reference table 318. If the user does not want any more notification for the document 316, the document may be marked not to be monitored 320. For example, the Alarm_flag is set to be "OFF" for the document in the document list. The notification system may continue to monitor all open documents which are marked to be monitored.

Referring back to FIG. 4, an exemplary document list 400 is shown. The user opened an application1 document with file name "HI", an application2 document with file name "Learning Eclipse", an application3 document with a file name "Presentation" and an application4 document with a file name "http://www.email.com/document1". The notification system may consult with the reference table and check whether each of the documents should be monitored by the system. The notification system may check notification flags of the associated applications. Since the notification flags for application1, application2, application3 are "ON" in the reference table, the notification system may add "HI" document 415, "learning Eclipse" document 420, and "presentation" document 425 into the document list 400 in order to monitor them. However, the notification flag for application4 is "OFF" and therefore the notification system may not add "http://www.email.com/document1" document to the document list 400. Initially, Alarm_flag 408 for each document 415, 420, 425 may be set to "ON" indicating the notification system will monitor the documents. At 7:15, the notification system detects that the user is away from "HI" document 415. The notification system may record 7:15 for the start time 410 of inactivity for "HI" document 415. The notification system will set the timer to expire at 7:45 since the period of inactivity value 406 is 30 minutes. If the system does not receive any input on the document for 30 minutes, the timer expires and initiates the notification process for "HI" document. The user will receive notification that "HI" document has been idling for 30 minutes. After receiving the notification, the user may go back to work on "HI" document. The notification system may continue to monitor all opened documents in the document list for their inactivity.

Figure 5:
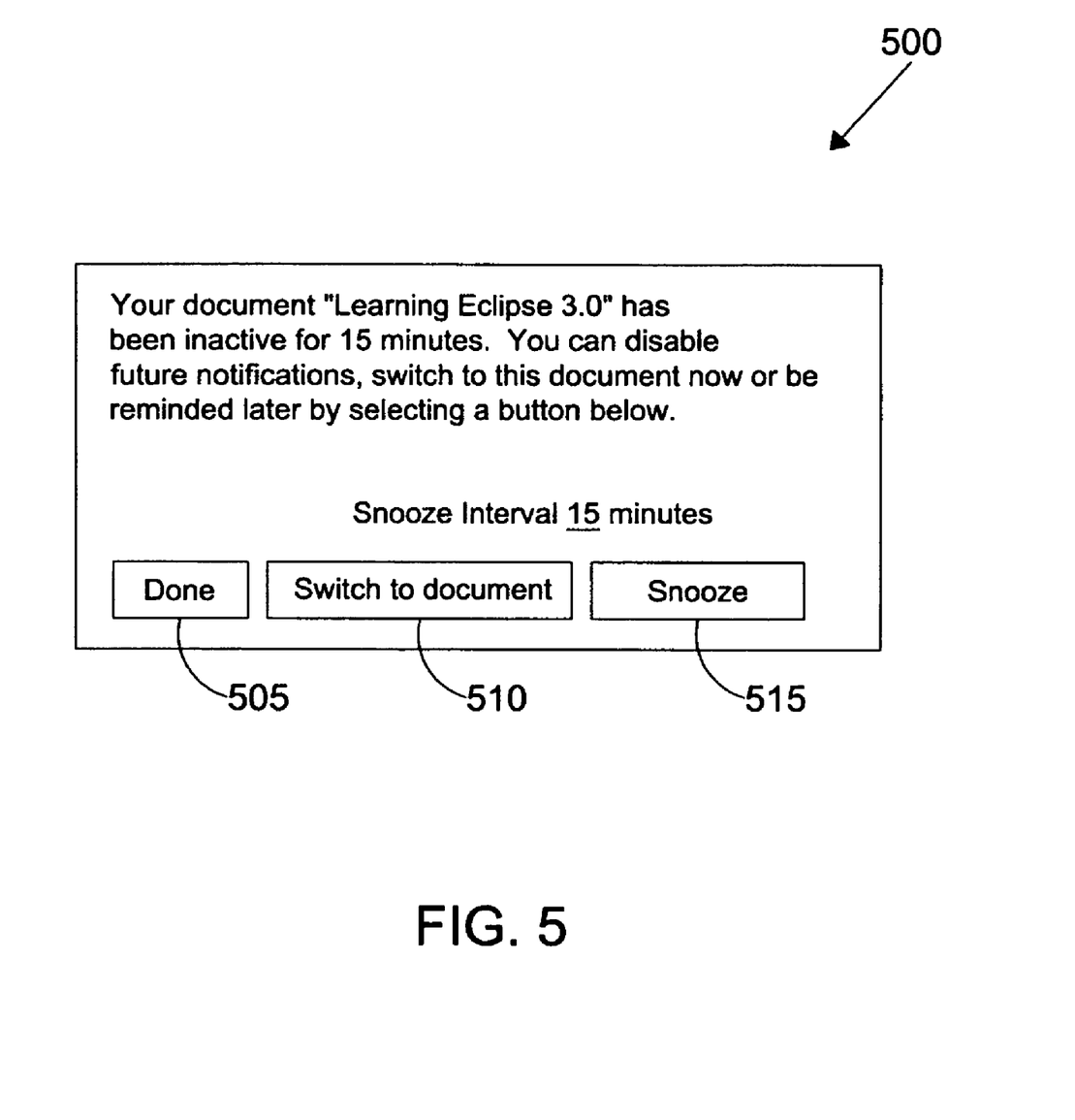
FIG. 5 is an illustration of a pop-up window for notification in accordance with the present invention.

There may be numerous ways to notify the user. One example may be a pop-up box with an audible alarm. Referring to FIG. 5, an exemplary notification pop-up box 500 is shown. Upon expiration of the timer, pop-up box may be displayed on the screen with an audible alarm. Alternatively, the pop-up box may be flashing to give more visual alarm to the user. In the exemplary pop-up box 500, the user may choose to disable any future notification for "HI" document by pressing "Done" button 505. The notification system may mark an alarm flag 408 of "HI" document in the document list with "OFF". The notification system will not monitor "HI" document any longer. On the other hand, the user may choose to resume drafting the document by pressing "Switch to Document" button 510. The notification system will disable a timer for "HI" document and erase start_time value 410 of the document from the document list, indicating "HI" document is no longer inactive. The user may choose "snooze" button for the second notification. The notification system will set the start_time 410 value of the document with the current time and set the timer accordingly. Alternatively, the user may input a desired period of inactivity 406 for the second notification. In another embodiment, the notification box may include "Auto Save" button requesting the operating system or the application to save the document and close the document window.

Figure 6:
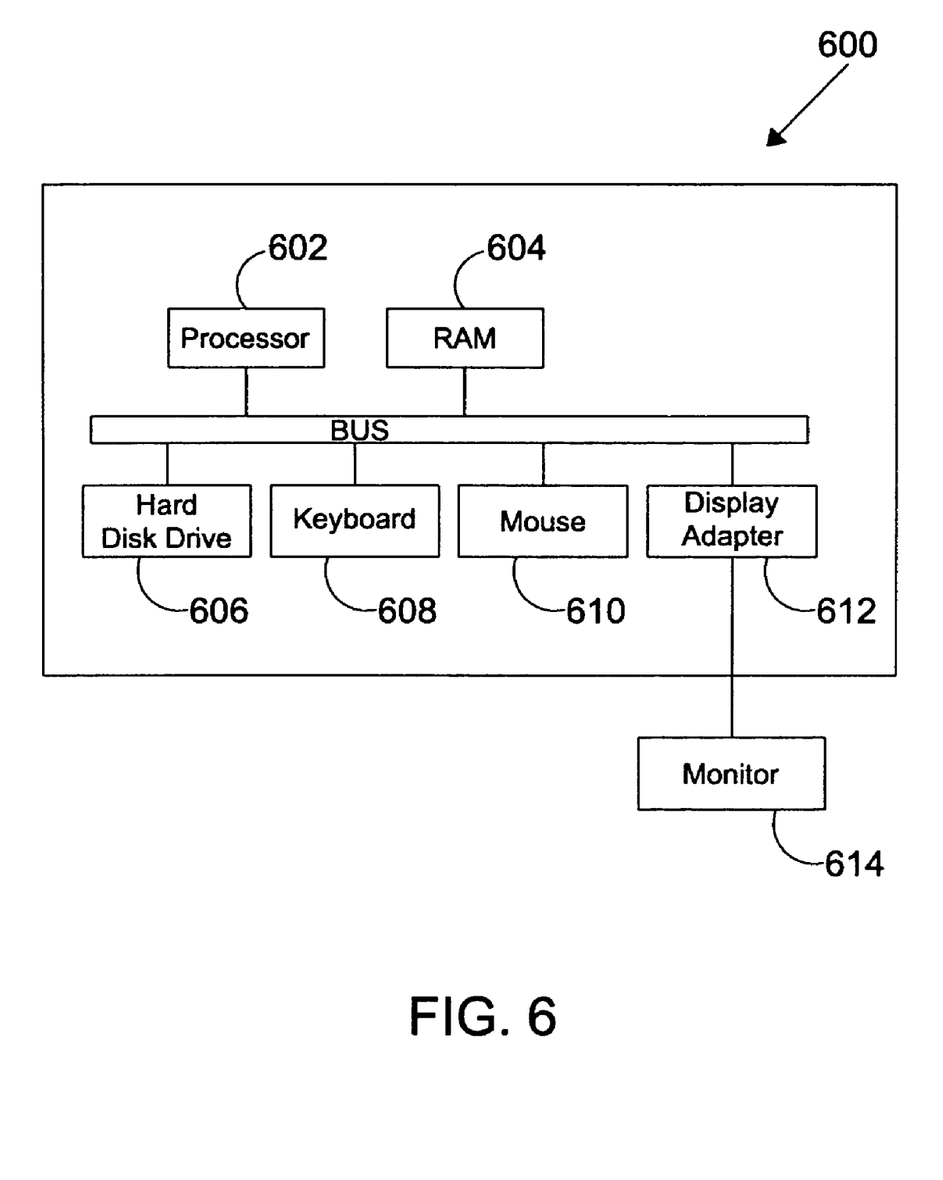
FIG. 6 is a schematic block diagram of a computer system for carrying out the method of the present invention.

Referring to FIG. 6, a schematic block diagram illustrating an exemplary computer system 600 for implementing notification of an inactive document in accordance with the present invention is shown. The computer system 600 may comprise a monitor 614 coupled to a control processing unit (CPU) 605 via a display adaptor 612, a Random Access Memory (RAM) 610, a Read Only Memory (ROM) 615, and a hard disk 620. The computer system 600 may use an operating system capable to support a multiple windows environment. For example, the computer system may use MICROSOFT WINDOWS® XP as its operating system. It is well known to the art that there are various operating systems capable to support a multiple windows environment. The monitor 614 will display a plurality of document windows. An external input will be fed into the computer system via an input device coupled to the CPU 605. The input device may be a keyboard, a mouse or the like. It is also well known in the art that the computer system will detect any activity of a user drafting a document based on the external input from the user.

In exemplary embodiments of the invention, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the notification system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for notifying a user, comprising steps of:
    monitoring a document opened by a user;
    detecting inactivity of a user input in said document via an external input device;
    upon detection of inactivity, enabling a timer for said document based on a desired period of inactivity value;
    notifying a user of inactivity of said document when the timer expires including providing a first notification to the user about said document via an audible and visual alarm; and
    receiving a user input,
    wherein said user input includes a disable notification input, a request for a second notification and a resuming drafting input.

2. The method as described in claim 1, further comprising a step of:
    disabling the first notification for said document upon reception of said disable notification input.

3. The method as described in claim 1, further comprising a step of:
    resetting said timer for said document upon reception of said resuming drafting.

4. The method as described in claim 1, further comprising steps of:
    obtaining a desired period of inactivity value from said user upon reception of said request for the second notification: and
    resetting said desired period of inactivity of said document to said document list.

5. The method as described in claim 1, wherein said external input device includes a keyboard.

6. The method as described in claim 1, wherein said external input device includes a mouse.

7. A method for notifying a user of an inactive document, comprising steps of:
    adding information of a plurality of documents opened by a user to a document list;
    monitoring said plurality of documents in said document list;
    detecting an inactive document among said plurality of documents in said document list;
    upon detection of inactivity, enabling a timer for said inactive document based on a desired period of inactivity value in said document list;
    adjusting said period of inactivity value by an amount in proportion to new content in said inactive document;

notifying a user of said inactive document when the timer expires including providing a first notification to the user about said inactive document via an audible and visual alarm; and receiving a user input, wherein said user input includes a disable notification input, a request for a second notification and a resuming drafting input.

8. The method as described in claim 7, wherein said inactivity is detected when there is no external input from said user via an input device.

9. The method as described in claim 8, wherein said input device includes a keyboard.

10. The method as described in claim 8, wherein said input device includes a mouse.

11. The method as described in claim 7, further comprising steps of:

building a reference table based on a user input if the user chooses to have a customized mode; and building a reference table based on a system default value if the user chooses to have a default mode.

12. The method as described in claim 11, said building a reference table based on a user input further comprising steps of:

displaying a plurality of applications operable in a computer system, said applications capable of supporting a document drafting;

obtaining a plurality of monitored applications which is desirable to be monitored;

obtaining a desired period of inactivity value of each of said plurality of monitored applications; and building said reference table with each of said plurality of monitored applications and said desired period of inactivity value of each of said plurality of monitored applications.

13. The method as described in claim 11, further comprising steps of:

determining whether each of said plurality of documents is to be monitored;

adding a document name of each of said plurality of documents to said document list; and adding a period of inactivity value of each of said plurality of documents to said document list, said period of inactivity value being obtained from said reference table.

14. The method as described in claim 7, further comprising a step of:

disabling the first notification for said document upon reception of said disable notification input.

15. The method as described in claim 7, further comprising a step of:

resetting said timer for said document upon reception of said resuming drafting.

16. The method as described in claim 7, further comprising steps of:

obtaining a desired period of inactivity value from said user upon reception of said request for the second notification: and resetting said desired period of inactivity of said document to said document list.

17. A notification system for notifying a user of an inactive document, comprising:

means for building a document list;

means for monitoring said plurality of documents in said document list;

means for detecting an inactive document among said plurality of documents in said document list;

means for setting a timer for said inactive document based on a desired period of inactivity value in said document list upon detection of inactivity;

means for notifying a user of said inactive document when the timer expires, said means for notifying further including means for providing a first notification to the user about said inactive document via a pop-up window with an audible alarm; and means for receiving a user input, wherein said pop-up window includes a disable notification button, a request for a second notification button and a resuming drafting button.

18. The notification system as described in claim 17 wherein said inactive document is detected when there is no external input from said user via an input device.

19. The notification system as described in claim 18, wherein said input device includes a keyboard.

20. The notification system as described in claim 18, wherein said input device includes a mouse.

21. The notification system as described in claim 17, further comprising;

means for building a reference table based on a user input if the user chooses to have a customized mode; and means for building a reference table based on a system default value if the user choose to have a default mode.

22. The notification system as described in claim 21, further comprising:

means for displaying a plurality of applications operable in a computer system, said applications capable of supporting a document drafting;

means for obtaining a plurality of monitored applications which is desirable to be monitored;

means for obtaining a desired period of inactivity value of each of said plurality of monitored applications; and means for building said reference table with each of said plurality of monitored applications and said desired period of inactivity value of each of said plurality of monitored applications.

23. The notification system as described in claim 21, further comprising:

means for determining whether each of a plurality of open documents are supported by one of a plurality of monitored applications;

means for adding a document name of each of said plurality of open documents to said document list; and means for adding a period of inactivity value of each of said plurality of open documents to said document list, said period of inactivity value being obtained from said reference table, wherein said reference table provides information of said plurality of monitored applications.

24. The notification system as described in claim 17, further comprising:

means for disabling the first notification for said inactive document when said user presses said disable notification button.

25. The notification system as described in claim 17, further comprising:

means for disabling said timer for said inactive document when said user presses said resume drafting button.

26. The notification system as described in claim 17, further comprising:

means for obtaining a desired period of inactivity value from said user when said user presses said request for the second notification button: and means for resetting said desired period of inactivity of said inactive document to said document list.

27. A method for notifying a user of an inactive document, comprising steps of:

adding information of a plurality of documents opened by a user to a document list;

monitoring inactivity of said plurality of documents in said document list;

detecting an inactive document among said plurality of documents in said document list;

upon detection of inactivity, enabling a timer for said inactive document based on a desired period of inactivity value in said document list;

notifying a user of said inactive document when the timer expires, including providing a first notification to said user about said inactive document via an audible and visual alarm; and receiving a user input, said user input including a disable notification input, a request for a second notification, and a resuming drafting input, wherein a reference table is built based on user inputs if the user chooses to have a customized mode and includes a plurality of monitored applications, a period of inactivity value of each of said plurality of monitored applications.

28. The method as described in claim 27, wherein said reference table is built based on a system default value if the user chooses to have a default mode.

29. The method as described in claim 27, further comprising steps of:

displaying a plurality of applications operable in a computer system, said applications capable of supporting a document drafting;

obtaining said plurality of monitored applications which is desirable to be monitored;

obtaining said desired period of inactivity value of each of said plurality of monitored applications; and building said reference table with each of said plurality of monitored applications and said desired period of inactivity value of each of said plurality of monitored applications.

30. The method as described in claim 27, said adding information step further comprising steps of:

determining whether each of said plurality of documents is supported by one of said plurality of monitored applications;

adding a document name of each of said plurality of documents to said document list; and adding a period of inactivity value of each of said plurality of documents to said document list, wherein said reference table is consulted for said information of said plurality of documents which includes said plurality of monitored applications and said period of inactivity value.

31. The method as described in claim 27, further comprising a step of:

disabling the first notification for said inactive document upon reception of said disable notification input.

32. The method as described in claim 27, further comprising a step of:

resetting said timer for said inactive document upon reception of said resuming drafting.

33. The method as described in claim 27, further comprising steps of:

obtaining a desired period of inactivity value from said user upon reception of said request for the second notification: and resetting said desired period of inactivity of said inactive document to said document list.

* * * * *